United States Patent Office 2,885,441
Patented May 5, 1959

2,885,441

N-MONOALKYL- AND N,N-DIALKYL-N-[TRIS(HYDROXYMETHYL) METHYL]AMINES AND PREPARATION THEREOF

Bernard L. Zenitz, Delmar, N.Y., assignor to Sterling Drug Inc., New York, N.Y., a corporation of Delaware No Drawing. Application September 17, 1956
Serial No. 610,407

16 Claims. (Cl. 260—584)

This invention relates to hydroxylated secondary and tertiary amines, and in particular it is concerned with N-monoalkyl- and N,N-dialkyl-N-[tris(hydroxymethyl)methyl]amines wherein the N-monoalkyl or N,N-dialkyl groups have a total of between twelve and twenty carbon atoms, inclusive. The invention also concerns acid-addition salts of said amines, and methods for the preparation of said amines.

The number of carbon atoms in the alkyl groups attached to the nitrogen atom as set forth above is critical because chemotherapeutic evaluation of the compounds of the invention has shown that only then do they possess antiviral and antibacterial properties. This is a surprising result in view of the fact that the known homologous N-hexyl-N-[tris(hydroxymethyl)methyl]amine and N,N-dipentyl-N-[tris(hydroxymethyl)methyl]amine are devoid of these activities.

The hydroxylated secondary and tertiary amines of my invention are represented by the following structural formula:

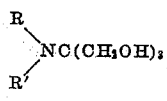

I wherein R is a hydrogen atom or an alkyl group having from one to fourteen carbon atoms, inclusive, R' is an alkyl group having from six to twenty carbon atoms, inclusive, and the sum of the number of carbon atoms in R and R' is between twelve and twenty, inclusive.

The exact nature of the alkyl groups represented by R and R' is not critical, the only critical feature being the total carbon content of the molecule. Thus when R is an alkyl group it can be any of such straight chained or branched chained groups as methyl, ethyl, propyl, isopropyl, butyl, isobutyl, secondary-butyl, tertiary-butyl, pentyl, isopentyl, hexyl, isohexyl, heptyl, octyl isooctyl, nonyl, decyl, undecyl, dodecyl, tridecyl, tetradecyl, and the like. Likewise R' in representing an alkyl group of six to twenty carbon atoms can be any of such groups as hexyl, isohexyl, 2-methylpentyl, heptyl, isoheptyl, octyl, isoocytyl, nonyl, decyl, undecyl, dodecyl, tridecyl, tetradecyl, pentadecyl, hexadecyl, heptadecyl, octadecyl, nonadecyl, eicosyl, and the like.

The compounds of the invention can be prepared by direct alkylation of tris (hydroxymethyl)methylamine, $H_2NC(CH_2OH)_3$. The latter is heated with an alkyl ester, RX, where X is the anion of a strong acid, in the presence of an acid acceptor. The anion X is one derived from a strong mineral acid, including such anions as chloride, bromide, iodide, nitrate, sulfate, phosphate, and the like, or strong organic acids, including such anions as methanesulfonate, benzenesulfonate, and the like. The halides are preferred anions. There is produced a mixture of secondary amine, $RNHC(CH_2OH)_3$, and tertiary amine, $R_2NC(CH_2OH)_3$, the relative amounts depending on the molar ratios of tris(hydroxymethyl)methylamine and alkyl ester used. If one molar equivalent of alkyl ester is used, the secondary amine predominates as the product. If two or more molar equivalents of alkyl ester are used, the tertiary amine predominates, although appreciable quantities of secondary amine can be isolated from the reaction mixture. The mixtures of secondary and tertiary amines are readily separated into their components by taking advantage of the fact that the sulfate salts of the secondary amines are readily soluble in water, whereas the tertiary amine sulfates are relatively water-insoluble. Thus, if the mixture is shaken with dilute aqueous sulfuric acid, the secondary amine dissolves whereas the tertiary amine sulfate forms an oily upper layer which is readily separated.

The acid acceptor can be any basic substance which will neutralize the acid, HX, that is split out during the course of the reaction, and which will not otherwise interfere with the reaction. Inorganic bases, such as the alkali and alkaline earth metal hydroxides, carbonates and bicarbonates can be used. Preferred acid acceptors are the alkali metal carbonates, viz. sodium carbonate or potassium carbonate.

Although the reaction can be conducted in the absence of media, it is preferred to employ suitable chemically inert solvents, for example, lower-alkanols, as reaction media. Appreciable quantities of water are to be avoided in order to prevent hydrolysis of the alkyl ester. The reaction mixture is heated at a temperature between about 50° and 150° C., conveniently at the reflux temperature of the inert solvent.

Another method for preparing tertiary amines of my invention comprises reacting a Grignard reagent, R''Mg-halide, with a compound having the formula

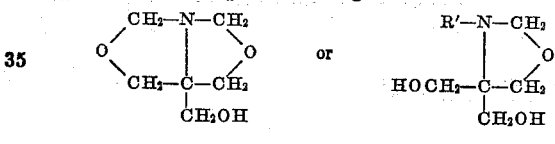

II          III

In the Grignard reagent, R''Mg-halide, R'' represents an alkyl group having one less carbon atom than the alkyl group R to be introduced in forming compounds of Formula I. The halide is preferably bromide or iodide. If the intermediate II is used, symmetrical compounds of the formula $R_2NC(CH_2OH)_3$, where both N-alkyl groups are identical, are produced. If the intermediate III is used, compounds of the formula $RR'NC(CH_2OH)_3$, where R and R' can be the same or different, are produced.

The reaction of R''Mg-halide with compounds of Formula II or III is carried out under conditions used for Grignard type reactions, for example, in anhydrous ether medium.

The intermediates of Formulas II and III are readily prepared by condensation of formaldehyde with tris (hydroxymethyl)methylamine or with a secondary amine $R'HNC(CH_2OH)_3$, respectively.

The structures of the compounds of the invention are established by the mode of synthesis and corroborated by chemical analysis.

The invention contemplates the compounds of Formula I both in the free base form and in the form of acid-addition salts. The preferred acid-addition salts are those which are appreciably water-soluble so that they may be prepared for use in aqueous solution. The secondary amines of the invention (I, R is H) readily form water-soluble salts with conventional acids, such as hydrochloric, hydrobromic, hydriodic, nitric, sulfuric, phosphoric, acetic, propionic, lactic, quinic, phthalic, methanesulfonic, p-toluenesulfonic acids, and the like. The tertiary amines (I, R is alkyl) form water-insoluble salts with many acids, such as hydrochloric and sulfuric acids, but these salts are useful as intermediates in separating the secondary from the tertiary amines. Soluble salts of the tertiary amines can be prepared from organic acids such as acetic acid, propionic acid, quinic acid and phthalic acid.

The compounds of the invention have been found to possess bactericidal activity against such organisms as *Staphylococcus aureus, Eberthella typhi, Pseudomonas aeruginosa, Aspergilla niger,* and the like; and viricidal activity against such species as feline pneumonitis virus, rabies virus, canine distemper virus, meningopneumonitis virus, and the like.

The bactericidal activity was determined in vitro by measuring the minimal concentration necessary to kill the bacteria in 10 minutes, and it was found that the compounds were effective in dilutions ranging from 1:1000 to 1:100,000. They were effective either when dissolved in acid solution, such as aqueous acetic, propionic, quinic or phthalic acids, or when dispersed in neutral aqueous medium by means of a surface active agent. For example, N,N - dinonyl - N - [tris(hydroxymethyl)methyl] amine, 0.1% solution in 0.4% aqueous "superinone" (an oxyethylated alkylphenol-formaldehyde polymer) containing a trace of phosphate buffer, was found to kill *E. typhi* at dilutions of 1:100,000 and *Staph. aureus* at dilutions of 1:30,000.

The viricidal activity was determined by treating live virus in vitro with a solution of the compound in aqueous acid or alcoholic solution containing 0.5% bovine albumin, then injecting the solution into a susceptible animal species such as the mouse or the chick embryo, and observing whether disease developed. The compounds of the invention were found to be effective at dilutions of 1:2500 to 1:20,000.

The compounds are prepared for use by preparing a dilute solution in aqueous acid or a neutral solution containing a surfactant, and applied to a surface to be disinfected by conventional means such as spraying, swabbing, immersion, and the like.

The following examples will further illustrate the invention without limiting the same thereto.

EXAMPLE 1

*N,N-dinonyl-N-[tris(hydroxymethyl)methyl]amine*

A mixture of 87.0 g. (0.42 mole) of n-nonyl bromide, 24.2 g. (0.20 mole) of tris(hydroxymethyl)methylamine, 42.4 g. (0.40 mole) of sodium carbonate and 250 ml. of n-butyl alcohol was refluxed for twenty-four hours with stirring. An additional 21 g. of sodium carbonate was added, and the mixture was refluxed for twenty-four hours longer. The addition of 21 g. of sodium carbonate was again repeated, and the mixture refluxed for twenty-four hours longer. The reaction mixture was cooled, and the inorganic salts removed by filtration and washed with ethanol. The combined filtrate and washings were concentrated in vacuo on a steam bath, and the residue mixed with 800 ml. of hexane and shaken with 950 ml. of water containing 50 ml. of concentrated sulfuric acid. The lower aqueous layer was separated from the hexane layer, and the hexane layer was washed with dilute sulfuric acid (15 ml. of concentrated sulfuric acid in 485 ml. of water). The aqueous layer and the aqueous washings were combined, diluted with 1 liter of water and allowed to stand in a separatory funnel. Two layers formed, a lower aqueous layer containing the secondary amine sulfate and an upper layer of insoluble tertiary amine sulfate. The latter layer was washed with two 300 ml. portions of water, dissolved in 350 ml. of chloroform, and the chloroform solution was washed with eight 600 ml. portions of water, then with two 100 ml. portions of concentrated ammonium hydroxide, and dried over anhydrous calcium sulfate. The chloroform solution was concentrated on a steam bath in vacuo, and the residue (36.4 g.) was crystallized from 70 ml. of acetone with cooling in a methanol-ice bath, giving 19.0 g. of N,N-dinonyl-N-[tris(hydroxymethyl)methyl]amine. A sample when recrystallized from acetone had the M.P. 35.5–38.5° C. (corr.).

*Analysis.*—Calcd. for $C_{22}H_{47}NO_3$: C, 70.72; H, 12.68; N, 3.75. Found: C, 70.50; H, 12.39; N, 3.81.

N,N-dinonyl-N-[tris(hydroxymethyl)methyl]amine was found to be bactericidally effective at a dilution of 1:30,000 vs. *Staphylococcus aureus* and 1:100,000 vs. *Eberthella typhi.*

N,N-dinonyl-N-[tris(hydroxymethyl)methyl]amine was found to be soluble in aqueous acetic, propionic, quinic and phthalic acids to produce solutions of the acetate, propionate, quinate and phthalate salts, respectively.

The original aqueous layer containing the secondary amine sulfate and all aqueous washings of the chloroform solutions were combined and made basic with 50% sodium hydroxide. Upon cooling a crystalline solid separated which was collected by filtration, washed with water and dried. Recrystallization from acetone gave 17.9 g. of N-nonyl-N-[tris(hydroxymethyl)methyl]amine, M.P. 84.5–88° C. (corr.).

*Analysis.*—Calcd. for $C_{13}H_{29}NO_3$: C, 63.12; H, 11.82; N, 5.66. Found: C, 63.32; H, 11.72; N, 5.68.

By replacement of the n-nonyl bromide in the preceding preparation by a molar equivalent amount of isooctyl bromide or 1-bromo-2,6-dimethylheptane, there can be obtained, respectively, N,N-diisooctyl-N-[tris(hydroxymethyl)methyl]amine or N,N-di-(2,6-dimethylheptyl)-N-[tris(hydroxymethyl)methyl]amine.

The secondary amine, N-nonyl-N-[tris(hydroxymethyl)methyl]amine, obtained in the preceding preparation, can be reacted with pentyl bromide, heptyl bromide or isohexyl bromide, by heating in the presence of sodium carbonate, to give, respectively, N-nonyl-N-pentyl-N-[tris(hydroxymethyl) methyl]amine, N-nonyl-N-heptyl-N-[tris(hydroxymethyl)methyl]amine, or N-nonyl-N-isohexyl-N-[tris(hydroxymethyl)methyl]amine.

Example 2

N,N-didecyl-N-[tris(hydroxymethyl)methyl]amine was prepared from 69.7 g. (0.315 mole) of n-decyl bromide, 18.1 g. (0.150 mole) of tris(hydroxymethyl)methylamine, and 63.6 g. of sodium carbonate in 200 ml. of butanol according to the manipulative procedure described above in Example 1. The total product after evaporation of the butanol was shaken with 500 ml. of hexane and 500 ml. of dilute sulfuric acid. In this instance three layers separated, an upper hexane layer, a lower aqueous layer containing secondary amine sulfate, and a middle layer comprising the tertiary amine sulfate. The layers were separated and worked up as described in Example 1. There was thus obtained 16.9 g. of N,N-didecyl-N-[tris(hydroxymethyl)methyl]amine, M.P. 41–44° C. (corr.), and 15.2 g. of N-decyl-N-[tris(hydroxymethyl)methyl]amine, M.P. 87–89° C. (corr.).

*Analysis.*—Calcd. for $C_{24}H_{51}NO_3$: C, 71.76; H, 12.80; N, 3.49. Found: C, 71.77; H, 12.50; N, 3.47.

*Analysis.*—Calcd. for $C_{14}H_{31}NO_3$: C, 64.34; H, 11.96; N, 5.36. Found: C, 64.36; H, 11.90; N, 5.41.

N,N-didecyl-N-[tris(hydroxymethyl)methyl]amine was found to be bactericidally effective at a dilution of 1:8000 vs. *Staphylococcus aureus* and 1:7500 vs. *Eberthella typhi,* whereas N-decyl-N-[tris(hydroxymethyl)methyl]amine was effective at dilutions of 1:100 and 1:250, respectively.

EXAMPLE 3

N,N-diheptyl - N - [tris(hydroxymethyl)methyl]amine was prepared from 56.4 g. (0.315 mole) of n-heptyl bromide, 18.1 g. (0.15 mole) of tris(hydroxymethyl) methylamine, and sodium carbonate in 200 ml. of butanol according to the manipulative procedure described above in Example 1. There was thus obtained 13.1 g. of N,N-diheptyl-N-[tris(hydroxymethyl)methyl]amine, M.P. 53.5–55.5° C. (corr.) when recrystallized from hexane, and 11.4 g. of N-heptyl-N-[tris(hydroxymethyl)methyl]amine, M.P. 70.5–72.5° C. (corr.) when recrystallized from acetone.

*Analysis.*—Calcd. for $C_{18}H_{39}NO_3$: C, 68.09; H, 12.38; N, 4.41. Found: C, 67.77; H, 12.15; N, 4.41.

*Analysis.*—Calcd. for $C_{11}H_{25}NO_3$: C, 60.23; H, 11.49; N, 6.39. Found: C, 60.55; H, 11.35; N, 6.43.

N,N - diheptyl - N-[tris(hydroxymethyl)methyl]amine was found to be bactericidally effective at a dilution of 1:3000 vs. *Eberthella typhi*.

EXAMPLE 4

N,N - dioctyl - N - [tris(hydroxymethyl)methyl]amine was prepared from 60.8 g. (0.315 mole) of n-octyl bromide, 18.1 g. (0.15 mole) of tris(hydroxymethyl)methylamine, and sodium carbonate in 200 ml. of butanol according to the manipulative procedure described above in Example 1. There was thus obtained 10.4 g. of N,N-dioctyl - N - [tris(hydroxymethyl)methyl]amine, M.P. 33.5–35° C. (corr.), and 10.1 g. of N-octyl-N-[tris(hydroxymethyl)methyl]amine, M.P. 74–77° C. (corr.).

*Analysis.*—Calcd. for $C_{20}H_{43}NO_3$: C, 69.51; H, 12.54; N, 4.05. Found: C, 69.63; H, 12.55; N, 4.02.

*Analysis.*—Calcd. for $C_{12}H_{27}NO_3$: C, 61.77; H, 11.67; N, 6.00. Found: C, 61.52; H, 11.46; N, 6.07.

N,N - dioctyl - N - [tris(hydroxymethyl)methyl]amine was found to be bactericidally effective at a dilution of 1:30,000 vs. *Staphylococcus aureus* and 1:60,000 vs. *Eberthella typhi*, whereas N-octyl-N-[tris(hydroxymethyl)methyl]amine was ineffective at a dilution of 1:100.

EXAMPLE 5

N - dodecyl - N - [tris(hydroxymethyl)methyl]amine was prepared from 82.2 g. (0.33 mole) of n-dodecyl bromide, 36.3 g. (0.30 mole) of tris(hydroxymethyl)methylamine, and sodium carbonate in 200 ml. of butanol according to the manipulative procedure described above in Example 1. In this preparation only the aqueous layer containing the soluble secondary amine sulfate was worked up, giving 20.8 g. of N-dodecyl-N-[tris(hydroxymethyl)methyl]amine, M.P. 92–95° C. (corr.) when recrystallized first from acetone and then from ethanol.

*Analysis.*—Calcd. for $C_{16}H_{35}NO_3$: C, 66.39; H, 12.19; N, 4.84. Found: C, 66.28; H, 12.10; N, 4.77.

N - dodecyl - N - [tris(hydroxymethyl)methyl]amine was found to be bactericidally effective at a dilution of 1:10,000 vs. *Staphylococcus aureus* and *Eberthella typhi*.

EXAMPLE 6

*N-tetradecyl-N-[tris(hydroxymethyl)methyl]amine*

A mixture of 55.5 g. (0.20 mole) of n-tetradecyl bromide, 30.3 g. (0.25 mole) of tris(hydroxymethyl)methylamine, 21.2 g. (0.20 mole) of sodium carbonate and 150 ml. of absolute ethanol was refluxed for twenty-four hours with stirring. An additional 10.6 g. of sodium carbonate was then added and the mixture refluxed for forty-eight hours longer. The mixture was stirred with 1 liter of water, the solid material separated by filtration, the solid material stirred with 1 liter of water, again filtered and dried. The product was dissolved in 1 liter of acetone, the solution filtered, the filtrate concentrated to a volume of 500 ml. and cooled in an ice bath. The product which separated was collected by filtration, giving 46.4 g. of N-tetradecyl-N-[tris-(hydroxymethyl)methyl]amine, M.P. 89–91.5° C. A sample when recrystallized once from acetone and then twice from ethanol had the M.P. 92.5–95° C. (corr.).

*Analysis.*—Calcd. for $C_{18}H_{39}NO_3$: C, 68.09; H, 12.38; N, 4.41. Found: C, 67.80; H, 12.19; N, 4.39.

N - tetradecyl - N - [tris(hydroxymethyl)methyl]amine was found to be effective bactericidally at a dilution of 1:1000 vs. *Eberthella typhi*.

N - tetradecyl - N - [tris(hydroxymethyl)methyl]amine can be caused to react with hydrochloric acid, hydrobromic acid, hydriodic acid, nitric acid, sulfuric acid, phosphoric acid, acetic acid, propionic acid, lactic acid, quinic acid, phthalic acid, methanesulfonic acid, or p-toluenesulfonic acid, to give, respectively, the hydrochloride, hydrobromide, hydroiodide, nitrate, sulfate (or bisulfate), phosphate (or acid phosphate), acetate, propionate, lactate, quinate, phthalate, methanesulfonate, or p-toluenesulfonate salts.

By replacement of the tetradecyl bromide in the preceding preparation by a molar equivalent amount of 1-bromo-3-methylpentadecane, octadecyl bromide, or eicosyl bromide, there can be obtained, respectively, N-(3-methylpentadecyl) - N - [tris(hydroxymethyl)methyl]amine, N - octadecyl - N - [tris(hydroxymethyl)methyl]amine or N - eicosyl - N - [tris(hydroxymethyl)methyl]amine.

EXAMPLE 7

N - hexadecyl - N - [tris(hydroxymethyl)methyl]amine was prepared from 61.0 g. (0.20 mole) of n-hexadecyl bromide, 30.3 g. (0.25 mole) of tris(hydroxymethyl)methylamine, and sodium carbonate in 200 ml. of ethanol according to the manipulative procedure described above in Example 6. There was thus obtained 58.7 g. of N-hexadecyl - N - [tris(hydroxymethyl)methyl]amine, M.P. 90–94° C. (corr.) when recrystallized twice from acetone and three times from ethanol.

*Analysis.*—Calcd. for $C_{20}H_{43}NO_3$: C, 69.86; H, 12.53; N, 4.05. Found: C, 69.67; H, 12.35; N, 3.89.

N - hexadecyl - N - [tris(hydroxymethyl)methyl]amine was found to be effective bactericidally at a dilution of 1:1750 vs. *Staphylococcus aureus* and 1:750 vs. *Eberthella typhi*.

EXAMPLE 8

*N,N-dioctyl-N-[tris(hydroxymethyl)methyl]amine* n-Heptylmagnesium bromide was prepared from 17.5 g. (0.72 mole) of magnesium and 129.0 g. (0.72 mole) of n-heptyl bromide in 600 ml. of anhydrous ether, using a crystal of iodine to initiate the reaction. After the preparation of the Grignard reagent was completed, 29.0 g. (0.20 mole) of 5-hydroxymethyl-1-aza-3,7-dioxabicyclo[3.3.0]octane in 700 ml. of dry ether was added over a period of forty minutes at such a rate as to maintain reflux. The reaction mixture was then refluxed for six hours and allowed to stand at room temperature for about fifteen hours. There was then added dropwise with stirring a solution of 72 g. of concentrated sulfuric acid in 200 ml. of water. The ether layer was separated and washed with two 500 ml. portions of 5% sulfuric acid. The first sulfuric acid extraction caused the formation of an intermediate third layer comprising the insoluble tertiary amine sulfate which was separated and dissolved in chloroform. Concentrated ammonium hydroxide was added to neutralize the sulfate, and the chloroform solution was washed with ammonium hydroxide and dried over anhydrous calcium sulfate. The chloroform solution was concentrated in vacuo and the residue crystallized from 150 ml. of dry acetone, and then recrystallized from 70 ml. of methanol, giving 41.6 g. of N,N-dioctyl - N - [tris(hydroxymethyl)methyl]amine, M.P. 38.5–40° C. (uncorr.), identical with the product obtained above in Example 4.

*Analysis.*—Calcd. for $C_{20}H_{43}NO_3$: C, 69.52; H, 12.54. Found: C, 69.66; H, 12.32.

EXAMPLE 9

N,N-dinonyl-N-[tris(hydroxymethyl)methyl]amine was obtained from 9.40 g. of magnesium, 75.0 g. of n-octyl bromide and 14.5 g. of 5-hydroxymethyl-1-aza-3,7-dioxabicyclo[3.3.0]octane according to the manipulative procedure described above in Example 8. There was thus obtained 25.7 g. of N,N-dinonyl-N-[tris(hydroxymethyl)methyl]amine, M. P. 43.5–46° C. (uncorr.), when recrystallized first from acetone and then from ethanol, identical with the compound obtained in Example 1.

*Analysis.*—Calcd. for $C_{22}H_{47}NO_3$: C, 70.73; H, 12.69. Found: C, 70.90; H, 12.52.

EXAMPLE 10

N,N-dihexyl-N-[tris(hydroxymethyl)methyl]amine was prepared from 8.1 g. (0.33 mole) of magnesium, 50.0 g. (0.33 mole) of n-pentyl bromide and 14.5 g. (0.10 mole) of 5-hydroxymethyl-1-aza-3,7-dioxabicyclo[3.3.0]octane according to the manipulative procedure described above in Example 8. The reaction mixture was treated cautiously with 350 ml. of 10% ammonium chloride solution, stirred for one-half hour, the water layer was separated, and the solid material suspended therein was collected by filtration and washed with ether. The combined ether layer and washings were dried over anhydrous calcium sulfate and concentrated, the residue was recrystallized from 50 ml. of acetone, giving 12.95 g. of N,N-dihexyl-N-[tris(hydroxymethyl)methyl]amine, M. P. 67–68.5° C. (corr.).

*Analysis.*—Calcd. for $C_{16}H_{35}NO_3$: C, 66.39; H, 12.19; N, 4.84. Found: C, 66.61; H, 12.24; N, 4.82.

N,N-dihexyl-N-[tris(hydroxymethyl)methyl]amine was found to be bactericidally effective at a dilution of 1:1000 vs. *Staphylococcus aureus* and *Eberthella typhi*, whereas the lower homologous N,N-dipentyl-N-[tris(hydroxymethyl)methyl]amine was devoid of activity at concentrations ten times as great, i.e., at a dilution of 1:100.

N,N-dihexyl-N-[tris(hydroxymethyl)methyl]amine was also prepared from 54.5 g. of n-hexyl bromide and 18.1 g. of tris(hydroxymethyl)methylamine with sodium carbonate in 200 ml. of butanol according to the manipulative procedure described above in Example 1.

EXAMPLE 11

(*a*) *3-tetradecyl-4,4-bis(hydroxymethyl)oxazolidine*

A mixture of 15.88 g. (0.050 mole) of N-tetradecyl-N-[tris(hydroxymethyl)methyl]amine (Example 6) and 1.72 g. (0.0575 mole) of paraformaldehyde in 100 ml. of dry benzene was refluxed for about three hours, using a water separator to remove the water formed in the reaction. The reaction mixture was concentrated, and the residue recrystallized twice from hexane, giving 14.65 g. of 3-tetradecyl-4,4-bis(hydroxymethyl)oxazolidine, M. P. 48.0–49.5° C. (corr.).

*Analysis.*—Calcd. for $C_{19}H_{39}NO_3$: C, 69.24; H, 11.93; N, 4.25. Found: C, 69.50; H, 11.55; N, 4.23.

(*b*) *N-tetradecyl-N-butyl-N-[tris(hydroxymethyl)methyl]amine* n-Propylmagnesium bromide was prepared from 3.10 g. (0.128 mole) of magnesium and 15.90 g. (0.128 mole) of n-propyl bromide in 100 ml. of absolute ether, using a crystal of iodine to initiate the reaction. After the preparation of the Grignard reaction was complete, 11.65 g. (0.0355 mole) of 3-tetradecyl-4,4-bis(hydroxymethyl)oxazolidine in 150 ml. of absolute ether was added over a period of one-half hour. Tetrahydrofuran (25 ml.) was then added, and the reaction mixture was refluxed for about seven hours. There was then added gradually 150 ml. of 10% ammonium chloride solution, and the resulting solid material was collected by filtration. The filtrate was extracted three times with chloroform. The solid was dissolved in about 200 ml. of water containing 13.2 g. of concentrated sulfuric acid, the solution filtered and the filtrate extracted three times with chloroform. The chloroform extracts were washed with dilute ammonium chloride solution and dried over anhydrous calcium sulfate. The total chloroform extracts were concentrated to dryness and the residues recrystallized from pentane, giving N-tetradecyl-N-butyl-N-[tris(hydroxymethyl)methyl]amine, M. P. 48.5–50° C. (corr.).

*Analysis.*—Calcd. for $C_{22}N_{47}NO_3$: C, 70.73; H, 12.69; N, 3.75. Found: C, 70.82; H, 12.65; N, 3.69.

EXAMPLE 12

(*a*) 3-decyl-4,4-bis(hydroxymethyl)oxazolidine was prepared from 14.2 g. (0.0543 mole) of N-decyl-N-[tris(hydroxymethyl)methyl]amine (Example 2), and 1.88 g. (0.0625 mole) of paraformaldehyde in 100 ml. of benzene according to the manipulative procedure described above in Example 11, part (*a*). A sample of the basic product was converted to its hydrochloride salt by treatment with an excess of ethereal hydrogen chloride, giving 3-decyl-4,4-bis(hydroxymethyl)oxazolidine hydrochloride, M. P. 116–119° C. (corr.).

*Analysis.*—Calcd. for $C_{15}H_{31}NO_3 \cdot HCl$: C, 58.12; H, 10.41; N, 4.52. Found: C, 58.01; H, 10.40; N, 4.49.

(*b*) N-decyl-N-octyl-N-[tris(hydroxymethyl)methyl]amine was prepared from n-heptylmagnesium bromide (derived from 3.23 g. (0.132 mole) of magnesium and 23.8 g. (0.132 mole) of n-heptyl bromide) and 10.12 g. (0.0369 mole) of 3-decyl-4,4-bis(hydroxymethyl)-oxazolidine according to the manipulative procedure described above in Example 11, part (*b*). There was thus obtained about 11.7 g. of N-decyl-N-octyl-N-[tris(hydroxymethyl)methyl]amine in the form of a yellow oil.

I claim:

1. A compound selected from the group consisting of compounds having the formula

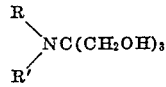

wherein R is a member of the group consisting of hydrogen and alkyl groups having from one to fourteen carbon atoms, R' is an alkyl group having from six to twenty carbon atoms, and the sum of the number of carbon atoms in R and R' is between twelve and twenty, inclusive; and acid-addition salts thereof.

2. A compound having the formula $$R'NHC(CH_2OH)_3$$

wherein R' is an alkyl group having from twelve to twenty carbon atoms.

3. A compound having the formula

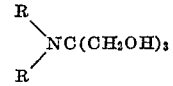

wherein R is an alkyl group having from six to ten carbon atoms.

4. An acid-addition salt of a compound having the formula $$R'NHC(CH_2OH)_3$$

wherein R' is an alkyl group having from twelve to twenty carbon atoms.

5. An acid-addition salt of a compound having the formula

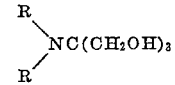

wherein R is an alkyl group having from six to ten carbon atoms.

6. N-tetradecyl-N-[tris(hydroxymethyl)methyl]amine.

7. An acid-addition salt of N-tetradecyl-N-[tris(hydroxymethyl)methyl]amine.

8. N,N-dioctyl-N-[tris(hydroxymethyl)methyl]amine.

9. N,N-dinonyl-N-[tris(hydroxymethyl)methyl]amine.

10. An acid-addition salt of N,N-dinonyl-N-[tris(hydroxymethyl)methyl]amine.

11. The process for preparing a compound having the formula

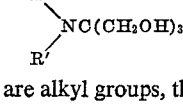

wherein R and R' are alkyl groups, the sum of the number of carbon atoms of which is between twelve and twenty, inclusive, which comprises reacting tris(hydroxymethyl)methylamine successively with between about one and two molar equivalents of RX and R′X, wherein X is the anion of a strong acid, in the presence of an acid acceptor, and separating the tertiary amine thus formed from the reaction mixture.

12. The process for preparing a compound having the formula $$R'NHC(CH_2OH)_3$$

wherein R′ is an alkyl group having from twelve to twenty carbon atoms, which comprises reacting tris(hydroxymethyl)methylamine with between about one and two molar equivalents of an alkyl ester, R′X, wherein X is the anion of a strong acid, in the presence of an acid acceptor, and separating the secondary amine thus formed from the reaction mixture.

13. The process for preparing a compound having the formula $$\begin{array}{c}R\\ \diagdown\\ N C(CH_2OH)_3\\ \diagup\\ R\end{array}$$

wherein R is an alkyl group having from six to ten carbon atoms, which comprises reacting tris(hydroxymethyl)methylamine with at least about two molar equivalents of an alkyl ester, RX, wherein X is the anion of a strong acid, in the presence of an acid acceptor, and separating the tertiary amine thus formed from the reaction mixture.

14. The process for preparing N-tetradecyl-N-[tris(hydroxymethyl)methyl]amine which comprises reacting tris(hydroxymethyl)methylamine with about one molar equivalent of n-tetradecyl bromide in the presence of an acid acceptor.

15. The process for preparing N,N-dioctyl-N-[tris(hydroxymethyl)methyl]amine which comprises reacting tris(hydroxymethyl)methylamine with at least about two molar equivalents of n-octyl bromide in the presence of an acid acceptor.

16. The process for preparing N,N-dinonyl-N-[tris(hydroxymethyl)methyl]amine which comprises reacting tri(hydroxymethyl)methylamine with at least about two molar equivalents of n-nonyl bromide in the presence of an acid acceptor.

References Cited in the file of this patent

UNITED STATES PATENTS

| | | |
|---|---|---|
| 2,363,465 | Senkus | Nov. 21, 1944 |
| 2,363,466 | Senkus | Nov. 21, 1944 |
| 2,413,247 | Senkus | Dec. 24, 1946 |

OTHER REFERENCES

Brewster: Organic Chemistry (1948), page 262.